United States Patent

[11] 3,576,362

[72] Inventors Helmut Mayr;
 Richard Pelte; Theodor Huber, Munich, Germany
[21] Appl. No. 793,395
[22] Filed Jan. 23, 1969
[45] Patented Apr. 27, 1971
[73] Assignee Agfa-Gevaert Aktiengesellschaft
 Leverkusen, Germany
[32] Priority Jan. 31, 1968
[33] Germany
[31] P 16 22 167.3

[54] PHOTOGRAPHIC APPARATUS
 21 Claims, 3 Drawing Figs.
[52] U.S. Cl. .................................................. 352/169,
 352/177
[51] Int. Cl. ...................................................... G03b 21/38
[50] Field of Search ........................................... 352/169,
 176, 177, 178, 179

[56] References Cited
UNITED STATES PATENTS
| | | | |
|---|---|---|---|
| 2,083,646 | 6/1937 | Fuller............................ | 352/176 |
| 3,064,522 | 11/1962 | Fukuoka ....................... | 352/169 |
| 3,238,008 | 3/1966 | Krumbein...................... | 352/177 |

*Primary Examiner*—Louis R. Prince
*Assistant Examiner*—Denis E. Corr
*Attorney*—Michael S. Striker

ABSTRACT: The circuit of the electric motor in a motion picture camera is completed by an electromagnet whose armature arrests the shutter in a predetermined angular position when the motor is arrested. The electromagnet is energized by a capacitor, either directly or by way of a transistor. The circuit of the capacitor is completed by a main switch or by a trigger switch which latter is installed in the camera body and is actuated by a Bowden wire.

PHOTOGRAPHIC APPARATUS

BACKGROUND OF THE INVENTION

The present invention relates to photographic apparatus in general, and more particularly to improvements in motion picture cameras or still cameras. Still more particularly, the invention relates to improvements in devices which can initiate, control and terminate operation of the electric motor in a photographic apparatus.

In many presently known motion picture cameras wherein the shutter and the film transporting mechanism are driven by an electric motor, the motor circuit is completed by a trigger which closes a switch and simultaneously disengages the drive for the shutter and film transporting mechanism from a blocking device serving to maintain the shutter in a predetermined angular position when the camera is not in operation. As a rule, the blocking device comprises a system of levers or links one of which is moved against a projection of the shutter in response to release of the trigger whereby the lever or link arrests the drive which connects the shutter with the motor. In order to avoid damage to the motor, the aforementioned drive invariably includes a conventional friction clutch which enables the motor to rotate even if the shutter is held against rotation.

A drawback of just described cameras is that the designer is restricted in his freedom of selecting the position of the trigger on the camera body. Furthermore, the aforementioned mechanical blocking device which is actuated by the trigger and serves to arrest the rotary parts of the drive in a predetermined angular position occupies too much room which is at a premium in a portable motion picture camera for amateurs. The blocking device must be machined and assembled with a high degree of precision so that it contributes significantly to the initial and maintenance cost of the camera. The same holds true for the aforementioned friction clutch which is an essential component part of all presently known motion picture cameras wherein the shutter and the film transporting mechanism are driven by an electric motor. A camera which embodies a conventional friction clutch and a conventional blocking device for the drive must be provided with a bulky body which cannot be readily accommodated in a pocket.

SUMMARY OF THE INVENTION

An object of our invention is to provide a photographic apparatus with a novel control system for the electric motor which drives the film transporting mechanism and the shutter and to design the control system in such a way that it is more compact, less expensive, less prone to malfunction and lighter then the control systems of presently known photographic apparatus.

Another object of the invention is to provide a novel motion picture camera which can make individual exposures or a succession of exposures.

An additional object of the invention is to provide a motion picture camera wherein the conversion from operation with individual exposures to normal operation with a succession of exposures (or vice versa) consumes little time.

Still another object of the invention is to provide a motion picture camera whose movable parts are driven by an electric motor and wherein the driving connection between the motor and such movable parts does not include or need not include a friction clutch.

A further object of the invention is to provide a motion picture camera which can be operated by remote control with substantial savings in electrical energy.

Our invention resides in the provision of a photographic apparatus, particularly a motion picture camera, which comprises electric motor means, normally open control switch means in circuit with the motor means, electromagnetic actuating means energizable to thereby close the control switch means, a rotary member driven by the motor means (such member may constitute or form part of the shutter), blocking means responsive to deenergization of the actuating means to arrest the rotary member in a predetermined angular position, and energizing means for supplying energizing current to the actuating means. Such energizing means comprises capacitor means which can discharge directly through the winding of the actuating means for controls an amplifier transistor in response to closing of a main switch or a remotely controlled trigger switch. The blocking means for the rotary member preferably constitutes the armature of the actuating means.

Since the main switch (which can be closed by a customary trigger) controls energization of the actuating means which in turn controls the control switch means and the blocking means, the trigger for the main switch can be mounted at any desired point of the camera body.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
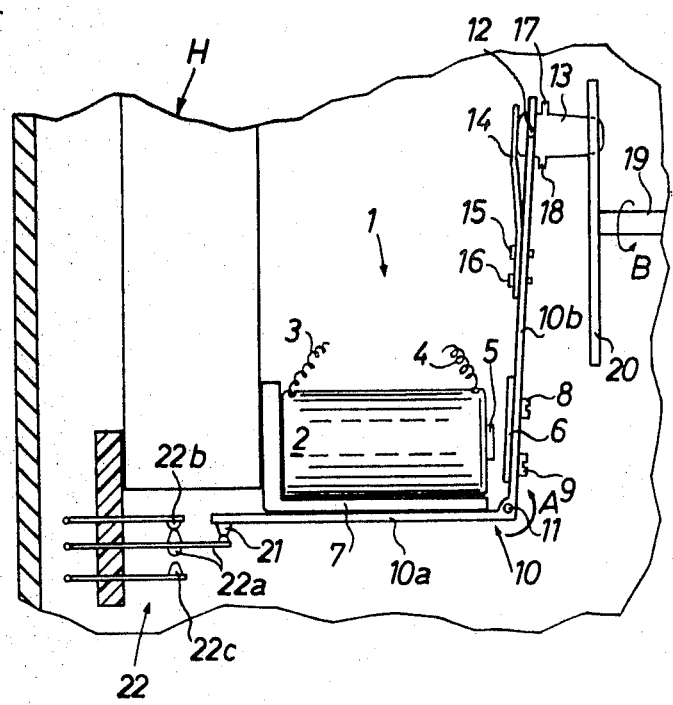
FIG. 1 is an enlarged fragmentary sectional view of a motion picture camera which embodies the improved electromagnetic actuating means.

FIG. 1 illustrates a portion of a motion picture camera which comprises a housing or body H accommodating an actuating device here shown as an electromagnet 1. The latter comprises a coil 2 with terminals 3, 4, or core 5, a movable armature including a plate 6, and a yoke 7. The plate 6 is connected by screws 8, 9 (or analogous fasteners) to one arm 10b of a two-armed blocking lever 10 which is fulcrumed at 11 and includes a second arm 10a extending along the outer side of the yoke 7. The fulcrum 11 is a pivot pin which is installed in the housing H. The free end of the arm 10b carries a pivot pin 12 for a sword-shaped blocking projection or head 13. This free end is preferably bifurcated or is formed with an opening so that a portion of the head 13 extends with clearance through the arm 10b and is engaged by a leaf spring 14 which is attached to the arm 10b by screws or rivets 15, 16. The right-hand portion of the head 13 is provided with two stops 17, 18 each of which can be moved into abutment with the adjoining portion of the arm 10b. It will be seen that the armature of the actuating electromagnet 1 includes the parts 6, 10, 13, 14 which together constitute a blocking device for a rotary member 20 of the camera. In the illustrated embodiment, the rotary member 20 is the camera shutter.

The electric motor 52 (FIG. 2) of the motion picture camera is operatively connected with a drive shaft 19 which carries the shutter 20. The shutter has an opening, recess or slot which can accommodate the right-hand portion of the head 13 whereby the head maintains the shutter and shaft 19 in a predetermined angular position.

The arm 10a of the lever 10 constitutes a trip and is provided with protuberance or bead 21 which cooperates with the movable contact 22a of a control switch 22. The switch 22 further comprises two stationary contacts 22b, 22c which flank the movable contact 22a.

When the electromagnet 1 is energized, the core 5 attracts the plate 6 and the latter causes the blocking lever 10 to pivot in a counterclockwise direction is indicated by the arrow A. The bead 21 on the free end of the arm 10a thereby moves the contact 22a away from the contact 22b and into engagement with the contact 22c of the control switch 22. The electromagnet 1 is said to be energized when there is sufficient current in the electromagnet to make contact 22a in contact with 22c. This completes the circuit of the motor 52 so that the motor rotates the drive shaft 29 (arrow B) and the shutter 20. The shaft 19 is free to rotate because the head 13 is withdrawn from the opening of the shutter 20 as soon as the electromagnet 1 is energized, i.e., as soon as the plate 6 pivots with the arm 10b in a counterclockwise direction. When the user of the motion picture camera opens the circuit of the coil 2, the electromagnet 1 is deenergized and the elastic movable contact 22a of the control switch 22 returns into engagement with the fixed contact 22b. At the same time, the contact 22a causes the blocking lever 10 to pivot in a clockwise direction and to move the right-hand portion of the head 13 against the rotating shutter 20. The circuit of the motor 52 is open as soon as the control switch 22 reassumes the position shown in FIG. 1; however, the shaft 19 continues to turn due to inertia and causes the shutter 20 to travel with reference to the head 13. The arrangement is such that, when the head 13 engages the adjacent side of the shutter 20, it is caused to pivot about the pin 12 in a clockwise direction, as viewed in FIG. 1, so that its stop 18 engages the adjoining portion of the arm 10b and that the left-hand portion of the head moves the adjoining part of the leaf spring 14 away from the arm 10b. When the rotating shutter 20 moves its opening into registry with the right-hand portion of the head 13, the latter snaps into such opening and thereby arrests the shutter 20 and shaft 19 in a predetermined angular position in which the shutter prevents scene light from reaching an unexposed film frame. The spring 14 is then free to return to the position shown in FIG. 1 and moves the stop 18 away from the arm 10b. This spring serves as a means for normally maintaining the head 13 in a preselected angular position with reference to the arm 10b.

Figures 2, 3:
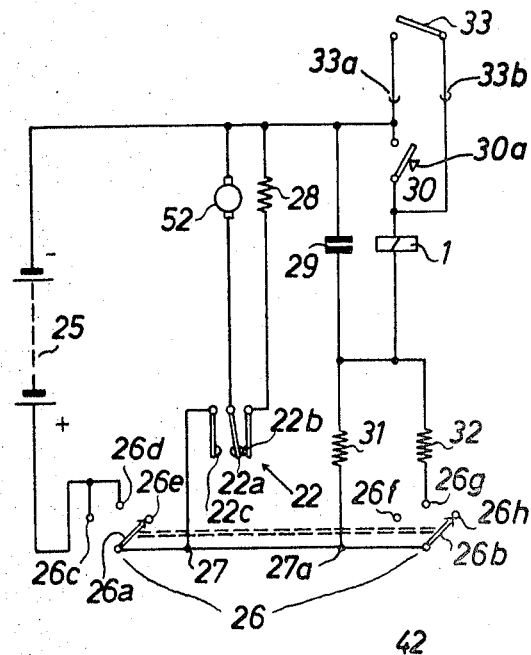
FIG. 2 is a diagrammatic view of the electric circuit in the camera which embodies the structure of FIG. 1.
FIG. 3 is a similar diagrammatic view of the electric circuit in a second motion picture camera.

The electric circuit of a motion picture camera which embodies the structure of FIG. 1 is illustrated in FIG. 2. The circuit includes a battery 25 or an analogous replaceable or rechargeable energy source whose positive pole is connected with the fixed contacts 26c, 26d of a selector switch 26. This selector switch 26 has two interconnected movable contacts 26a, 26b which respectively cooperate with fixed contacts 26c, 26d, 26e and 26f, 26g, 26h.

The aforementioned electric motor 52 of the camera is connected between the negative pole of the battery 25 and the movable contact 22a of the control switch 22. The fixed contact 22c is connected to the movable contacts 26a, 26b, as at 27, and the fixed contact 26b is in series with a fixed resistor 28 which is connected in parallel with the winding of the motor 52. The circuit of the motor 52 can be completed by way of contacts 22a, 22c and contacts 26a, 26c or 26a, 26d. The circuit further includes a capacitor 29 which is connected in parallel with the electromagnet 1 in response to closing of a main switch 30. Two parallel-connected resistors 31, 32 can connect one plate of the capacitor 29 with the positive pole of the battery 25; the other plate of the capacitor 29 is permanently connected with the negative pole of the battery. The resistors 31, 32 then also connect the positive pole of the battery 25 with the terminal 3 or 4 of the winding 2 in the electromagnet 1. A trigger switch 33 which forms part of a remote-control camera operating device is in parallel with the main switch 30 and has contacts separably connected to two terminals 33a, 33b provided in a socket which is installed in the housing H.

THE OPERATION

The motion picture camera is idle when the switches of the circuit shown in FIG. 2 assume the illustrated positions. The movable contacts 26a, 26b of the selector switch 26 then respectively engage "blind" fixed contacts 26e, 26h. In order to prepare the motion picture camera for continuous operation (to make a succession of exposures at intervals determined by the motor speed), the user moves the contacts 26a, 26b of the selector switch 26 into engagement with the contacts 26d, 26g. The positive pole of the battery 25 is then connected with the fixed contact 22c of the control switch 22 (by way of the contacts 26d, 26a and tap 27) and with the resistors 31, 32 (by way of contacts 26d, 26a, tap 27a and contact 26g). The capacitor 29 is charged through the resistors 31 and 32. However, the motor 52 is still idle because the movable contact 22a of the control switch 22 remains in engagement with the fixed contact 22b. In order to start the motor 52, the user depresses a knob or a like trigger 30a to close the master switch 30 and to connect the winding 2 of the electromagnet 1 in parallel with the capacitor 29. The latter discharges through the winding 2 by causing a transient initial current to flow through and energize the electromagnet 1 which thereby causes its plate 6 to pivot the blocking lever 10 in a manner as described in connection with FIG. 1 whereby the head 13 on the arm 10b releases the shutter 20 and the arm 10a places the movable contact 22a into engagement with the fixed contact 22c which is already connected with the positive pole of the battery 25. The motor 52 drives the shaft 19 and the claw pulldown (not shown) of the film transporting mechanism so that the camera makes a succession of exposures at predetermined intervals as long as the trigger 30a continues to maintain the master switch 30 in close position. The steady state strength of the current flowing through the winding 2 of the electromagnet 1 and the resistors 31, 32 is selected in such a way that the electromagnet 1 remains in energized condition so that the arm 10a of the blocking lever 10 holds the contact 22a in engagement with the contact 22c of the control switch 22. When the trigger 30a is released, it permits or causes the main switch 30 to return to open position to thus deenergize the electromagnet 1. The movable contact 22a immediately returns into engagement with the fixed contact 22b of the control switch so that the circuit of the motor 52 is open. The head 13 reenters the opening of the shutter 20 because the shaft 19 continues to rotate due to inertia even after the control switch 22 opens the motor circuit. At the same time, the contacts 22a, 22b of the control switch 22 connect the motor 52 in parallel with the resistor 28. This causes the motor 52 (which then acts as a generator) to dissipate its energy in the resistor 28. It will be seen that the operative connection between the shaft 19 and the motor 52 need not include a friction clutch which is an essential component of drives in presently known motion picture cameras. Such friction clutches are expensive, often bulky and prone to malfunction.

If the user wishes to operate the camera by remote control, the trigger switch 33 is closed and the motor 52 is started in the same way as described above with the single exception that the capacitor 29 is connected in parallel with the winding 2 of the electromagnet 1 by way of the trigger switch 33 instead of main switch 30. The trigger switch 33 is preferably mounted in or on the housing H and can be closed by an elongated Bowden wire or the like from a point at a desired distance from the camera. An important advantage of such mounting of the trigger switch 33 (in or on the housing H) is that the current need not flow through elongated conductors which are normally employed in presently known remote control triggers. This is of particular advantage when the battery 25 is partly exhausted.

If the user wishes to make individual exposures, the movable contacts 26a, 26b of the selector switch 26 are caused to engage the fixed contacts 26c, 26f. Thus, the fixed contract 22c remains connected with the positive pole of the battery 25 but the circuit of the second resistor 32 is open so that, when the trigger 30a closes the main switch 30 (or when the trigger switch 33 is closed by remote control), the capacitor 29 is charged only through the resistor 31 but not through the resistor 32. The steady state strength of the current flowing through the winding 2 of the electromagnet 1 when the capacitor 29 and winding 2 are supplied current only through the resistor 31 is selected in such a way that such current cannot maintain the electromagnet 1 in energized condition. Thus, the electromagnet 1 is deenergized as soon as the capacitor 29 discharges through the winding 2 and this takes place after elapse of a short interval which suffices to rotate the shaft 19 through an angle which is necessary to make a single exposure. The motor 52 is then immediately connected in parallel with the resistor 28 for the purpose which was described above, and the movable contact 22a reengages the fixed contact 22b of the control switch 22. The head 13 of the blocking lever 10 arrests the shutter 20 in a predetermined angular position for reasons which were explained in connection with FIG. 1. In order to make a further individual exposure, the user must release the trigger 30a or open the trigger switch 33 to thereupon again close the main switch 30 or trigger switch 33 whereby the film transporting mechanism advances the film by the length of a frame and the shutter 20 admits scene light to the unexposed frame to make a single exposure.

FIG. 3 illustrates a portion of a second photographic apparatus. The electromagnet 1 is mounted in the collector circuit of an amplifier transistor 36. The base-emitter circuit of the transistor 36 includes a resistor 37 in parallel with a resistor 38. The selector switch 39 comprises coupled movable contacts 39a, 39b and two sets of fixed contacts 39c, 39d, 39e and 39f, 39g, 39h which can be respectively engaged by contacts 39a, 39b. The normally open main switch 40 is in parallel with a trigger switch 42 corresponding to the switch 33 of FIG. 2. The main switch 40 can connect a capacitor 41 into the base-emitter circuit of the amplifier transistor 36.

A further resistor 43 serves as a working resistance for a stabilizing element 44 which stabilizes the voltage supplied by a batter 45. A further resistor 46 forms part of a voltage divider when the main switch 40 is closed. This voltage divider further includes the resistor 38 and/or 37.

The exposure control of the photographic apparatus shown in FIG. 3 includes a photoelectric receiver 47 in series with a resistor 49 and a light meter 48, the latter having a needle 48a which serves as a means for adjusting the aperture size as a function of scene brightness. The exposure control further comprises an auxiliary switch 50 which can connect the light meter with a variable or fixed resistor 51. This resistor 51 serves to adjust the exposure control as a function of the sensitivity of film which is used by the photographer. The electric motor 52 is connected in the circuit of FIG. 3 in the same way as described in connection with FIG. 2, i.e., the motor circuit is completed when the control switch 22 assumes that position in which its movable contact 22a engages the fixed contact 22c while the movable contact 39a of the selector switch 39 engages the fixed contact 39c or 39d. The resistor 28 is connected in parallel with the motor 52 when the movable contact 22a of the control switch 22 is free to engage the fixed contact 22b.

When the user moves the selector switch 39 to a position in which its contacts 39a, 39b respectively engage the fixed contacts 39d and 39g, the camera is set to make a succession of exposures at intervals determined by the speed of the motor 52. The positive pole of the battery 45 is then connected with the fixed contact 22c of the control switch 22, with the emitter of the amplifier transistor 36, with the resistor 37, with one plate of the capacitor 41, with the stabilizing element 44, with one terminal of the light meter 48, and with the resistor 51. The capacitor 41 is charged through the resistor 46 so that the potential difference between its plates equals that between the terminals of the stabilizing element 44. If the user then closes the main switch 40 by way of the trigger 40a, the capacitor 41 discharges through the resistor 37 and the base-emitter circuit of the transistor 36. The current impulse produced in the base-emitter circuit is amplified in accordance with the amplification factor of the transistor 36 whereby the collector current of the transistor suffices to energize the electromagnet 1. The blocking lever 10 (FIG. 1) then causes the movable contact 22a of the control switch 22 to engage the fixed contact 22c and to thus complete the circuit of the motor 52. At the same time, the lever 10 releases the rotary elements 19, 20. When the capacitor 41 completes its discharge, there develops at the base of the transistor 36 a potential whose magnitude corresponds to the ratio of the voltage divider including the resistors 37 and 46. This potential is selected in such a way that the strength of the collector current flowing through the winding 2 at least suffices to maintain the electromagnet 1 in energized condition. Therefore, the motor 52 drives the shutter 20 and the film transporting mechanism as long as the user continues to maintain the main switch 40 in closed position. If the trigger 40a is released, it allows or causes the main switch 40 to return to open position whereby the transistor 36 blocks and the electromagnet 1 is deenergized so that the rotary elements 19, 20 come to a halt in a predetermined angular position under the action of the head 13 on the arm 10b of the blocking lever 10. Instead of completing the circuit by way of the main switch 40, the operator can close the trigger switch 42 by remote control.

If the user then decides to make an individual exposure, the contacts 39a, 39b of the selector switch 39 are moved into engagement with fixed contacts 39c, 39f. The resistor 38 is in parallel with the resistor 37 in the base-emitter circuit of the transistor 36. The capacitor 41 is charged in the same way as described above. When the main switch 40 is closed by the trigger 40a, the charged capacitor 41 is connected in the base-emitter circuit of the transistor 36 and its discharge current flows through the parallel-connected resistors 37, 38 as well as through the base of the transistor 36. The thus obtained collector current suffices to cause energization of the selector switch 22 engages the fixed contact 22c. However, the potential at the base of the transistor 36 is less than when the contact 39a, 39b respectively engage the contacts 39d, 39g because the resistor 38 is in parallel with the resistor 37, i.e., the ratio of the voltage divider is less. Therefore, the collector current flowing through the winding 2 is less than required to maintain the electromagnet 1 in energized condition. Thus, the electromagnet is deenergized immediately upon completed discharge of the capacitor 41 and the head 13 on the arm 10b of The blocking lever 10 arrests the rotary elements 19, 20 in a predetermined angular position after a single revolution (i.e., upon completion of a single exposure and upon completed transport of film by the length of a single frame). The movable contact 22a of the control switch 22 returns into engagement with the fixed contact 22b so that the resistor 28 is in circuit with the motor 52. A further individual exposure can be made by releasing the trigger 40a and by thereupon again closing the main switch 40 or by closing the trigger switch 42. The exposure control adjusts the diaphragm by way of the needle 48a of the light meter 48 as a function of scene brightness which is detected by the photosensitive receiver 47.

An important advantage of the structure which is shown in FIG. 3 is that it can employ a relatively small capacitor. An advantage which is common to both illustrated embodiments of our invention is that the trigger switch is installed in or on the housing H of the photographic apparatus. Thus, the current need not flow through an elongated cable. Consequently, the length of the cable (e.g., a Bowden wire) for operation of the camera by remote control can be selected at will and the cable need not conduct current, i.e., it must merely be in a position to close the trigger switch 33 or 42. It is not necessary to employ a separate set of batteries for operation of the camera by remote control.

Without further analysis, the forgoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended.

We claim:

1. In a photographic apparatus, a combination comprising electric motor means; normally open control switch means in circuit with said motor means; a driven member receiving motion from said motor means; electromagnetic actuating means energizable to thereby complete the circuit of said motor means, said actuating means including an armature movable to a first position in response to energization of said actuating means to thereby close said control switch means and a second position in response to deenergization of said actuating means to thereby effect stoppage of said driven member in a predetermined position; blocking means comprising a blocking member provided on said armature and extending into the path of movement of said driven member in the second position of said armature, and biasing means yieldably engaging said blocking member so that the latter yields temporarily on engagement with said driven member; energizing means including capacitor means and a source of current for supplying transient initial energizing current and a steady state current respectively to said actuating means; first resistor means for regulating the steady state strength of the current supplied by said source of current to said actuating means so that the actuating means is energizable for longer or shorter intervals of time; and second resistor means connected in parallel with said motor means in response to deenergization of said actuating means.

2. A combination as defined in claim 1 wherein said driven member is a rotary shutter.

3. A combination as defined in claim 2, wherein said shutter is provided with an opening which accommodates a portion of said blocking member in deenergized condition of said actuating means.

4. A combination as defined in claim 1, wherein said control switch means comprises a movable contact, a second contact which is engaged by said movable contact in response to energization of said actuating means, and a third contact which is engaged by said movable contact in response to deenergization of said actuating means.

5. A combination as defined in claim 1, wherein said control switch means comprises a movable contact, a second contact which is engaged by said movable contact in response to energization of said actuating means to thereby complete the circuit of said motor means, and a third contact which is engaged by said movable contact and thereby connects said resistor means in parallel with said motor means in response to deenergization of said actuating means.

6. A combination as defined in claim 1, wherein said capacitor means is in parallel with said actuating means and further comprising selector means movable between a plurality of positions and a source of electrical energy, said selector means being arranged to connect said source with said capacitor means and said actuating means by way of said first resistor means in at least one of said positions thereof.

7. A combination as defined in claim 6, wherein said first resistor means comprises a pair of resistors which are connected in parallel to each other and are connected with said capacitor means in a first position of said selector means, one of said resistors being connected with said capacitor means in a second position of said selector means.

8. A combination as defined in claim 7, wherein the resistances of said resistors are such that said capacitor means can supply current which maintains the actuating means in energized condition in the first position of said selector means and that said capacitor means can supply current which suffices for short-lasting energization of said actuating means in the second position of said selector means.

9. A combination as defined in claim 8, wherein said actuating means is energized only during discharge of said capacitor means in the second position of said selector means.

10. A combination as defined in claim 1, further comprising main switch means and means for closing said main switch means to thereby complete the circuit of said capacitor means and said actuating means.

11. A combination as defined in claim 10, wherein the means for closing said main switch means comprises a camera trigger.

12. A combination as defined in claim 1, further comprising electric amplifier means in circuit with said actuating means.

13. A combination as defined in claim 12, wherein said amplifier means comprises transistor means.

14. A combination as defined in claim 1, wherein said armature comprises a lever which is pivotable between said first and second positions.

15. In a photographic apparatus, a combination comprising electric motor means; normally open control switch means in circuit with said motor means; electromagnetic actuating means energizable to thereby close said control switch means; a rotary member driven by said motor means; blocking means responsive to deenergization of said actuating means to arrest said rotary member in a predetermined angular position; energizing means for supplying energizing current to said actuating means, said energizing means including capacitor means; electric amplifier means in circuit with said actuating means, said amplifier means comprising transistor means and said actuating means being connected in the collector circuit of said transistor means; and means for connecting said capacitor means in the base-emitter circuit of said transistor means.

16. A combination as defined in claim 15, wherein the means for connecting said capacitor means comprises a main switch and means for closing said main switch.

17. A combination as defined in claim 15, individual comprising a pair of resistors connected in parallel with each other and selector means for connecting at least one of said resistors between the base and emitter of said transistor means.

18. A combination as defined in claim 17, wherein said selector means is movable between a first position in which only one of said resistors is in circuit with said transistor means and a second position in which both said resistors are in circuit with said transistor means.

19. A combination as defined in claim 18, further comprising an additional resistor which constitutes a first voltage divider with said one resistor in the first position of said selector means and a second voltage divider with both said first mentioned resistors in the second position of said selector means.

20. A combination as defined in claim 19, wherein said voltage dividers are connected with the base of said transistor means in the respective positions of said selector means.

21. A combination as defined in claim 20, wherein the base potential of said transistor means in the first position of said selector means is such that the strength of collector current suffices to maintain said actuating means in energized condition, said base potential in the second position of said selector means being such that the collector current is weaker than necessary to maintain said actuating means in energized condition.